United States Patent [19]
Böhm et al.

[11] Patent Number: 5,156,781
[45] Date of Patent: Oct. 20, 1992

[54] COMPACT PRECISION EXTRUSION METHOD

[75] Inventors: Georg G. A. Böhm, Akron; Arthur W. Greenstreet, Clinton; Gregory D. Chaplin, Chippewa; Charles D. Spragg, Hudson, all of Ohio

[73] Assignee: Bridgestone Corporation, Tokyo, Japan

[21] Appl. No.: 632,567

[22] Filed: Dec. 24, 1990

[51] Int. Cl.[5] .............................. B29C 47/92
[52] U.S. Cl. .................... 264/40.1; 210/171; 210/446; 264/40.6; 264/40.7; 264/169; 264/211.23; 264/DIG. 65
[58] Field of Search ............ 264/40.1, 40.5, 40.6, 264/40.7, 68, 169, 176.1, 211.21, 211.23, 349, DIG. 65; 425/135, 143, 144, 145, 185, 190, 192 R, 197, 198, 199, 200, 204, 205, 207, 208, 209, 376.1, 378.1, 382.3, 382.4, 461, DIG. 39; 210/171, 446

[56] References Cited

U.S. PATENT DOCUMENTS

| | | | |
|---|---|---|---|
| 4,087,222 | 5/1978 | Noel | 425/107 |
| 4,863,653 | 9/1989 | Takubo et al. | 264/40.7 |
| 4,892,473 | 1/1990 | Elia et al. | 425/197 |
| 4,918,017 | 4/1990 | Greenstreet | 425/197 |
| 4,944,903 | 7/1990 | Nilsson | 264/40.1 |

FOREIGN PATENT DOCUMENTS

153197 12/1981 Fed. Rep. of Germany ...... 425/197

Primary Examiner—Leo B. Tentoni
Attorney, Agent, or Firm—Ernst H. Ruf

[57] ABSTRACT

A compact and precision extrusion system and method for extruding strips of rubber compounds with profiles of accurate dimensions. Strips of rubber compound are uniformly heated and mixed in an extruder and then passed through a low pressure drop strainer to remove foreign matter. The strained compound then is fed directly into a gear pump which delivers precise volumes of the rubber compound immediately into the spread chamber of an extrusion head after which it passes through a die to form a precise strip of the rubber compound. The strainer and extrusion head are movably mounted with respect to the gear pump for axial separation from the gear pump for easy removal of the rubber compound from the various components of the system to facilitate compound changes. A control system regulates the speed of the extruder to provide a near constant pressure at the entrance port of the gear pump to precisely regulate the rate of extrusion of the compound from the extrusion head. The extruder preferably includes a feed section, a pressure generation section, and a mix section which maintain the temperature of the rubber compound below 100° C.

16 Claims, 12 Drawing Sheets

COMPACT PRECISION EXTRUSION METHOD

BACKGROUND OF THE INVENTION

1. Technical Field

The field of art in which this invention pertains is that of an extrusion system and method particularly for use in extruding precision strips of rubber or elastomeric compounds with profiles of very accurate dimensions in a trouble free and essentially automated operation, and which enables rapid changeover between various types of such compounds. More particularly, the invention relates to such an extrusion system and method in which equilibrium conditions are reached rapidly during start up and after compound changes enabling the economic production of strip material, primarily for use in the subsequent manufacture of tires, air springs and similar items that include rubber compounds.

2. Background Information

Presently various extruders are used to produce rubber or elastomeric extrudates of different shapes. In spite of improvements in equipment design made over the past years, extrudate gauge and weight variations of more than 4% are typically encountered and significant gauge changes occur when rubber feed strips of different composition, stock viscosity and other properties including surface friction are used. The extrudate temperature typically is more than 120° C., particularly when the equipment is operated with an extrusion head and die requiring high pressures and at higher extrusion rates. Furthermore, when conventional strainers are used in line with an extruder, further temperature increases are induced due to the high pressure drop across the strainer screen and its support system. This, in turn, requires extrusion rates to be lowered up to 40% to keep the extrudate temperature from exceeding certain set limits. This temperature must be maintained at a predetermined level to prevent partial vulcanization of the rubber compound as it moves through the extruder, strainer, extrusion head and other components of the system to prevent imperfections in the final extruded strip.

Various types and elements of precision extrusion systems are known and have been used for the processing of a variety of plastics and fibers. However, the chemical make-up and mechanical properties of plastic and fibers and rubber or elastomeric compounds are completely different whereby the use of the various equipments and processes in the plastic and fiber industry is not compatible with or usable in the rubber industry and visa versa, since each technology has its own special problems and desired results to be achieved by a particular extrusion system and method. In a rubber extrusion system, the rubber being extruded will be of varying molecular weight and may contain a high concentration of fillers which can cause them to be very abrasive and can have a wide variety of viscosities. Furthermore, the makeup of rubber strips introduced into an extruder can vary appreciably. In a cold feed extruder system, the ambient temperature of the rubber can vary between 15° C. and 50° C. In a hot feed extruder on the other hand, the rubber strips may have a temperature of between 80° C. and 110° C. Therefore, since the feed compound in a rubber extrusion system is completely different than the feed material in a plastic extrusion system, that which works in the plastic extrusion system will not necessarily work in a rubber extrusion system.

Also, rubber will cure at relatively low temperatures and cannot tolerate high temperatures during the processing and extrusion thereof. Plastics generally are extruded at very high temperatures, for example, between 220° C. and 250° C. without any degrading or adverse effect on the plastics. When extruding rubber it is desirable to maintain the temperature of the rubber as low as possible, preferably at 100° C. or less. This lower extrusion temperature of the rubber is desirable since it allows the rubber compound to be formulated so that the onset of vulcanization occurs at a lower temperature which in turn reduces the time and cost of vulcanization. Lower temperature extruded rubber also will enable shorter cooling conveyor lengths to be utilized reducing equipment costs and processing time. Also, the lower temperature of the final extruded product will diminish the dimensional changes occurring in the extrudate upon leaving the extrusion die. However, during the extrusion of rubber compounds, heat buildup occurs due to shear and frictional heat generated during the screw extrusion of the rubber which is not a problem in the extrusion of plastics and fiber.

Thus, in the extrusion of rubber compound, it is desirable to achieve an accurate dimensional stability of the extrudate and low extrudate temperatures while straining and processing at high throughput rates. One of the means which facilitates the meeting of this objective is to use a long extrusion die land. However, this longer die land requires a high head pressure which in prior extrusion systems results in undesirable higher extrudate temperatures.

In the extrusion of rubber compound strips, in addition to the excess heating problems discussed above, another common problem is that, depending upon the origin of the raw rubber and rubber compounds supplied to the systems, a variety of foreign materials are present in the rubber which must be removed before the final extrusion of the strip. Heretofore, this required the use of separate screening and straining procedures to ensure that the rubber is relatively free of such foreign materials before entering it into the extrusion system. Various types of straining equipment have been devised for removing such foreign materials, but these result in a considerable pressure drop and temperature rise as the material moves through the strainer. Many of these problems have been eliminated by the construction of a low pressure drop strainer of the type shown in U.S. Pat. No. 4,918,017, which is also assigned to the assignee of the present invention.

Another problem with prior rubber extrusion systems, dissimilar to those in the plastic and fiber extrusion systems, is cleanout. It is desirable in rubber extrusion systems and methods that a variety of rubber compounds of various characteristics be used sequentially for manufacturing a variety of products. Heretofore, this required shut down of the equipment and a subsequent removal of the remaining compound before a new rubber compound could be moved through the system since the various components of the extrusion system are bolted together requiring hours to disassemble and clean. In the plastic and fiber extrusion industry, to avoid this extensive downtime, it is common practice to flush the components for several minutes with the new polymer and scrap the flushing extrudate. Such a flushing practice is not acceptable in the rubber extrusion industry because it is extremely slow and expensive, especially when a change in rubber compound may occur numerous times throughout a work shift. The only practical solution is to disassemble the components and to remove the rubber stock from the interior of the equipment.

Moreover, the tire industry often requires that smaller lots of differently shaped rubber or elastomeric strips are extruded, requiring frequent compound and die changes throughout the production day. Therefore, it is critical, in order to achieve economic production, that the time to reach the required dimensional specification of the particular configured extrudate passing through the die, must be as short as possible. This requires that the operating pressure and temperature at the die be reached and stabilized as quickly as possible which is difficult with an usual auger type extruder.

None of the above listed problems found in the extrusion of rubber compounds are a problem or are of much concern in the extrusion of plastics and fibers. Also, gear pumps to date, have not been successfully used in rubber extrusion, although the same have found some success in the extrusion of plastics and fiber.

SUMMARY OF THE INVENTION

An object of the present invention is providing solutions to the noted prior art problems in terms of apparatus and method by providing a compact precision extrusion system and method to produce an extremely accurate rubber extrudate.

A further objective of the invention is to provide such a system and method in which the temperature of the rubber compound is maintained within a predetermined temperature range generally less than 100° C. Each compound has a preferred processing window. But, in general, a lower extrudate temperature is desirable since there will be less deformation and shrinkage of the extrudate after leaving the die and less cooling will subsequently be required resulting in shorter cooling conveyors and thereby reduced equipment cost. Also, by maintaining a lower extrusion temperature of the rubber, compounds can be used which vulcanize at lower temperature thereby reducing the vulcanization time of the final product and increasing the efficiency of the manufacturing process. Thus, it is a primary objective to control the temperature of the rubber compound as it moves through the extrusion system.

A still further objective of the invention is to provide such an extrusion system and method which accurately and precisely controls the equipment of the system and movement of the rubber compound therethrough whereby the gauge and weight are accurately maintained in the final extrudate, and in which the extrudate dimensions can be quickly brought within specification with less manual involvement by operating personnel, via the incorporation of an automatic monitoring and control system therein.

Still another objective of the invention is to provide such an extrusion system and method in which a strainer is provided to remove foreign materials from the rubber compound to prevent damage to the equipment located downstream of the strainer, and which will not interfere with the precision extrusion of the rubber compound, and which will enable the rubber compound, at near ambient temperature, to be introduced directly into the system, eliminating the heretofore separate straining operation and subsequent handling and transportation of the raw rubber compound before and after the straining operation prior to it being introduced into the extrusion system. Likewise, with a low pressure strainer there is no significant temperature increase and no decrease in throughput rate, and it insures a quality extrudate free of defects.

A further objective of the invention is to provide such an extrusion system and method in which the various pieces of equipment are mounted for either axial and/or transverse movement with respect to each other to enable easy removal of the rubber compound from the different parts of the equipment and in a minimum amount of time which is required during compound changes, resulting in a more efficient system and reduced scrap.

A still further objective of the invention is to provide such an extrusion system and method which enables equilibrium conditions to be reached quickly during start up of the equipment and/or after compound changes, again increasing the operating efficiency and reducing scrap of the system.

Still another objective of the invention is to provide such an extrusion system and method in which accurate extrudate gauges can be maintained during changes of stock viscosity of the rubber feed strips by use of a gear pump and by providing a control system which continuously measures the various temperatures and pressures at the different positions of the system, which measurements are fed to a computer control which induces changes in the pump and feed speed during start up, shut down, and steady state operation of the equipment.

Still another objective of the invention is to provide such an extrusion system and method consisting of a short and compact feeder which uniformly heats and mixes the rubber compound placed therein, which in a cold feed extruder is at near ambient temperature, as the rubber moves through the feeder before being forced through a strainer and into a gear pump under sufficient pressure so that the gears of the pump are completely filled in order to deliver precise volumes of strained rubber compound immediately into a spread chamber of an extrusion head prior to passing through an extrusion die to form a uniform and constant extrudate strip.

A still further objective is to provide such an improved extrusion apparatus and method which is relatively trouble free and essentially automated by the unique arrangement of equipment and the interrelationship therebetween to provide the desired accurately controlled extrudate strip.

These objectives and advantages are obtained by the improved extrusion system of the invention for extruding a strip of rubber compound material, the general nature of which may be stated as including feed mixer means for receiving strips of rubber compound at generally ambient temperature for mixing and heating said compound uniformly to a desired temperature as the compound moves downstream through said feed mixer means toward a discharge end thereof; strainer means located at the discharge end of the feed mixer means for removing foreign matter from the rubber compound while minimizing pressure drop across said strainer means; gear pump means mounted adjacent to and downstream of the strainer means for delivering precise volumetric amounts of the compound at an exit port of said gear pump means; extrusion head means mounted adjacent to the exit port of the gear pump means for forming the delivered amounts of compound into an elongated strip of said compound; and separation means for separating the extrusion head means and strainer means from the gear pump means for removal of the rubber compound prior to a compound change.

These objectives and advantages are further obtained by the improved method of the invention, the general nature of which may be stated as a method of extruding a strip of rubber compound including the steps of uniformly mixing and heating strips of rubber compound as the compound moves through a screw type extruder; passing said uniformly heated and mixed rubber compound through a strainer to remove foreign matter from the rubber compound; delivering precise volumetric amounts of the rubber compound in strip form by passing said compound through a gear pump; and extruding strips of rubber compound from an extrusion head by reforming the strip of rubber compound received from the gear pump.

BRIEF DESCRIPTION OF THE DRAWINGS

Preferred embodiments of the invention, illustrative of the best modes in which applicants have contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENTS

Figure 1:
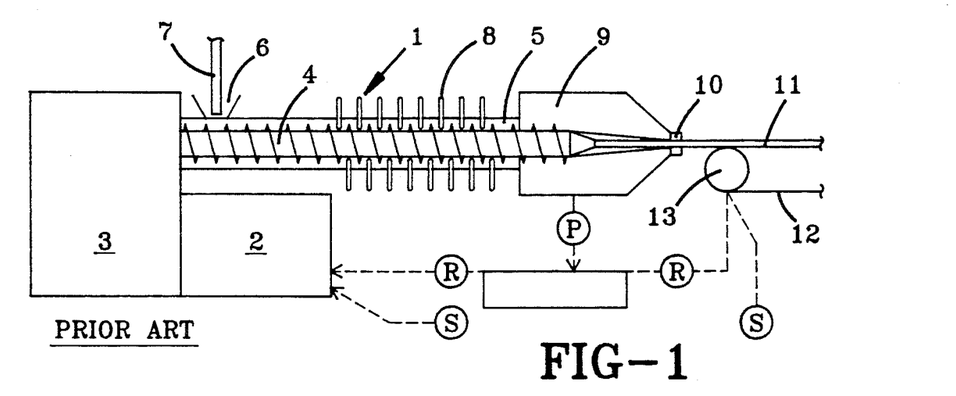
FIG. 1 is a diagrammatic view showing a usual prior art extrusion system for extruding strips of rubber compounds.

FIG. 1 discloses diagrammatically, a prior art extrusion system and method of which the present invention is an improvement thereon. Such prior art extrusion systems and arrangement of components generally consist of a usual screw type extruder 1 having a power drive source and motor 2 connected to a drive transmission 3 for rotating a usual screw 4 within a heated barrel 5. Both the screw and barrel are independently temperature controlled by circulating thermostatted liquid, such as water, which is heated during standby periods and cooled during operation. Also, such heaters are on only before the rubber compound starts to flow and then changes to cooling to maintain the desired temperature since the friction of the rubber being moved through the barrel creates sufficient heat. Extruder 1 has an input or throat 6 for feeding strips 7 of a vulcanizable rubber compound into the interior of barrel 5. Extruder 1 further includes a feed screw section working with an opposing feed roll, an auger pumping screw section which conveys and builds pressure within the rubber compound, a mixing section where pins 8, which are fixed to the barrel, interact with interruptions with the flights of screw 4, and a second auger pumping section to generate the final pressure within the rubber compound. Other mixing devices, such as barrier flights are sometimes used instead of pins 8 to achieve uniform mixing. It is common in nearly all prior art cold feed extruders that the incoming strip of rubber compound encounters a feed section, then a pump section, then a mix section, and then another pump section before passing through the extruder die.

In many instances, strips 7 were previously passed through some type of separate strainer or screen element in order to remove all foreign matter which may be contained therein so that the strips are free of such foreign matter as the rubber is heated and mixed as it is moved along barrel 5. Although such straining of the rubber is highly desirable not all strips were strained in prior art extrusion systems because of temperature increase, equipment cost, etc., occasionally resulting in a defective product which had to be scrapped.

This heated and mixed rubber compound then is passed directly into an extrusion head 9 where it is discharged through a die 10 to form the desired extruded strip 11. Strip 11 then is moved by a conveyor 12 having a drive roll 13 or the like connected thereto, for moving the strip to cooling zones and then to subsequent stages of the manufacturing process or to storage. Prior art systems are also provided with various types of safety signals to ensure a safe operation of the extrusion system as shown in FIG. 1, to prevent injury and machine damage, such as ON/OFF controls designated by the letter R, and various manually set speed settings for the screw and conveyor, as designated by the letter S. However, such controls are not for ensuring uniformity by modulating the screw speed as in the present invention.

As discussed above, prior art rubber extrusion systems such as shown in FIG. 1, have various shortcomings, the major shortcoming being the inability to produce extrudates of high dimensional accuracy and to allow for a high throughput rate while maintaining a low temperature of the strained rubber compound at all locations in the system. Also, it is difficult to provide adequate pressure to allow for the most efficient head designs since such higher pressures cause significant increases in extrudate temperature. Consequently, the design of the spread chamber and dies for prior art rubber extrusion heads had to be compromised to minimize the pressure requirement which resulted in the spread chambers of the extrusion heads having very large resident volumes and an undesirable shape of the extrusion dies. Prior art extrusion heads for rubber compounds have internal volumes equivalent to 15-30 seconds of production at normal production speeds which results in excessive scrap being generated at each changeover of rubber compound.

Figure 2:
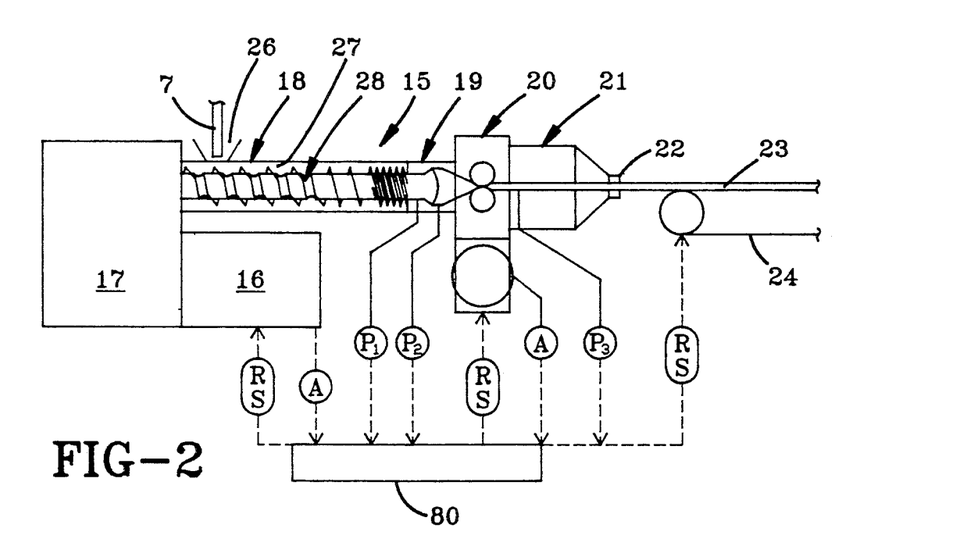
FIG. 2 is a diagrammatic view similar to FIG. 1, showing the improved precision extrusion system of the present invention for a cold strip feed.

This and other shortcomings are overcome by the improved system of the invention, indicated generally at 15 and shown diagrammatically in FIG. 2. System 15 is a "cold feed" system and includes a usual power source 16 and a transmission 17 which is connected to an improved feed mixer, indicated generally at 18. The output end of feed mixer 18 is connected to a low pressure drop strainer assembly 19, the output of the latter being connected to a precision gear pump 20. The exit of gear pump 20 is connected to an extrusion head 21 having an extrusion die 22 for forming the desired configuration of a strip 23 which can then be carried by a conveyor 24 or similar transport to a cooling zone for subsequent storage and/or further processing.

Figure 4:
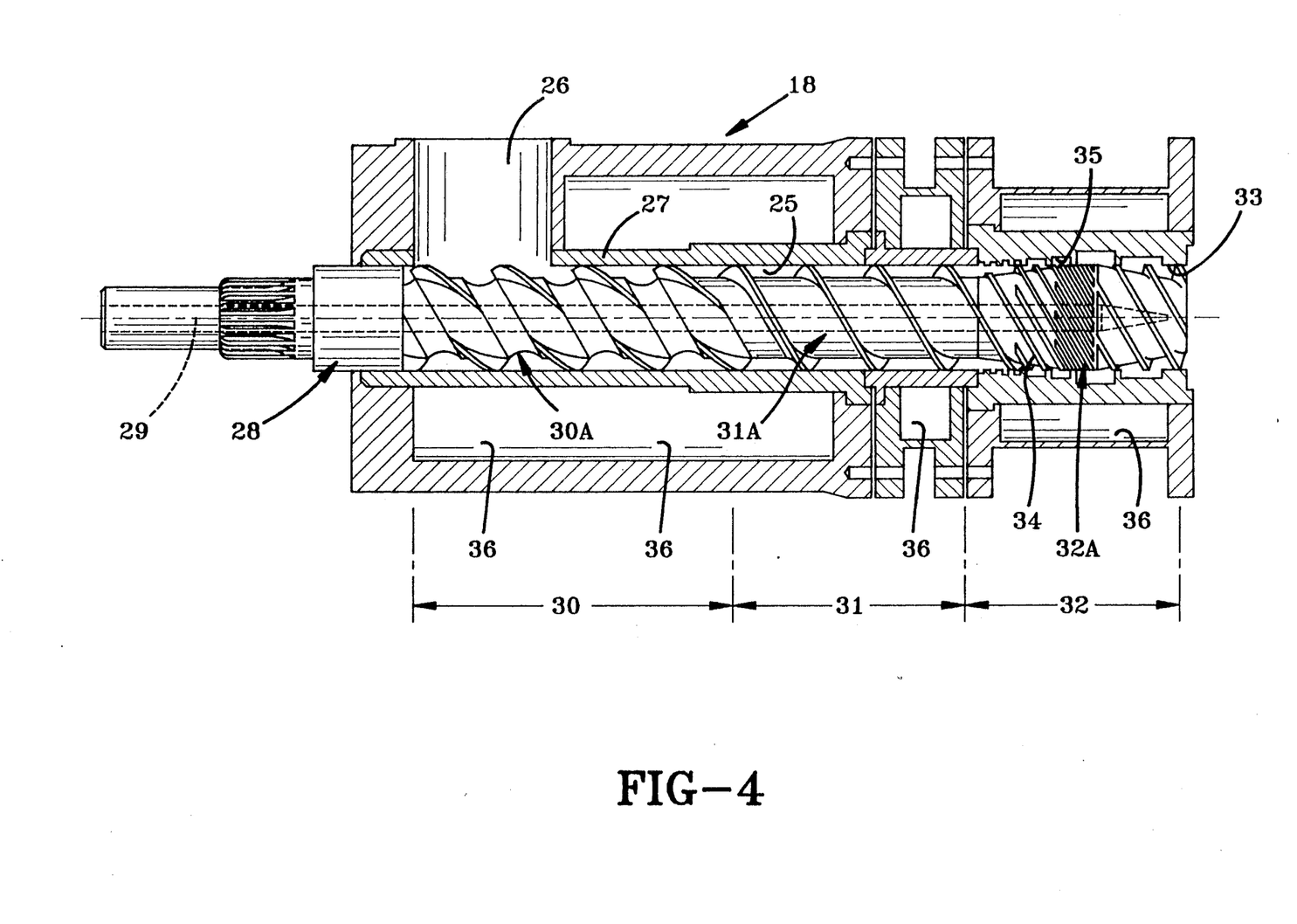
FIG. 4 is a generally diagrammatic sectional view of the improved feed mixer equipment of the improved system and method.
Figure 5:
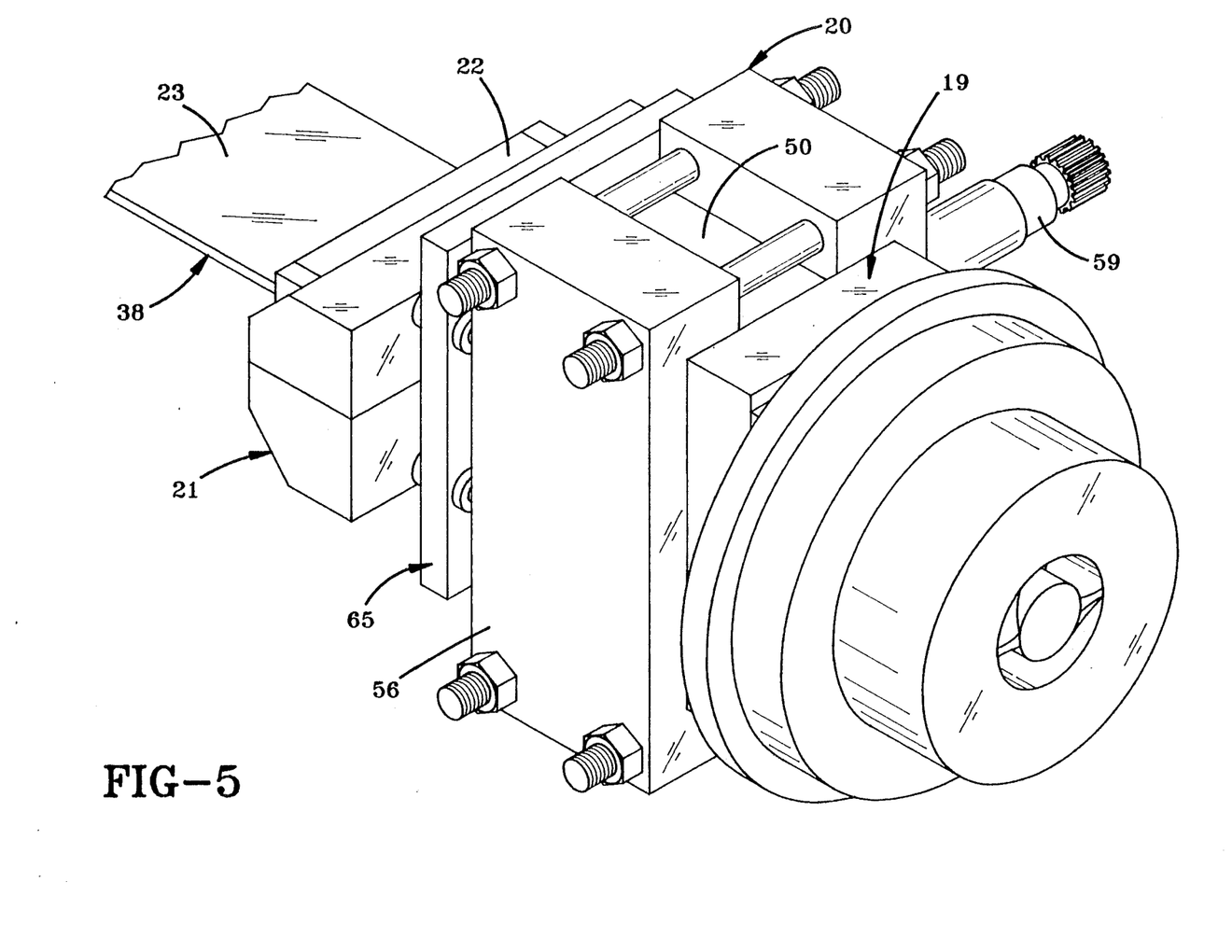
FIG. 5 is an enlarged perspective view showing a portion of the feed mixer, low pressure strainer assembly, gear pump and extrusion head components of the improved extrusion system in an assembled condition.

In accordance with one of the features of the invention, feed mixer 18 in a cold feed system, preferably is of a unique design and is shown particularly in FIG. 4. The function of feed mixer 18 is generally twofold. It initially must accept strips 7 of rubber or elastomeric compounds through an inlet opening 26 which are at or near ambient temperature, and then heat the rubber compound uniformly to a desired temperature as it is moved through a bore 25 of a heated barrel 27 by a unique feed and mixing screw, indicated generally at 28. The screw is formed with internal temperature control passages 29 for circulating a thermostatic liquid, such as water, therethrough, for heating and/or cooling the screw, and in turn the rubber compound in contact therewith. As indicated previously, the ambient strip temperature can vary between 15° C. and 50° C. depending upon the season of the year, geographical location, storage location, etc. Secondly, feed mixer 18 has to generate enough pressure to overcome the pressure drop in strainer assembly 19 and provide the minimum pressure required at an entrance port of gear pump 20 to reliably fill the gears of the pump as described in greater detail below.

In order to accomplish these features, feed mixer 18 is comprised of a feed section 30, a very short pressure generating section 31, and a mix section 32. Feed section 30 is more or less of a conventional design wherein the rubber is transferred along the barrel by a screw section 30A, an example of which may be of a type distributed by Paul Troester Maschinenfabrik of Hanover, Germany. The rubber then is transferred through section 31 by providing a usual helical auger screw 31A which conveys the rubber forwardly while generating enough pressure to ensure that the space between the gears of gear pump 20 are filled. The rubber then is uniformly mixed as it passes through mix section 32 before passing through an outlet end 33 of feed mixer 18. Section 32 preferably has a screw configuration 32A which mixes the rubber without generating excessive temperature increases from shearing of the rubber. This low temperature mixing is achieved by transferring the rubber from screw flights 34 to a series of grooves 35 formed in the barrel and then back into the screw flights at a different location. This is known as a multiple cut transfer mix, such as in mixing equipment distributed by Rubber Consulting Machinery of Zurich, Switzerland.

This unique arrangement of screw 28 provides the desired mixing as well as temperature equalization without excessive shearing and heating of the rubber, and most importantly it eliminates the second screw pumping zone as required in prior art rubber extruders. The uniqueness of this design lies in combining three known screw design features, namely, a usual feed screw 30A in section 30, with a usual helical auger screw 31A in a short pressure generating section 31, and by use of screw section 32A in a temperature neutral or a low temperature increase mix section 32. These sections utilize very short compact screw configurations, which would be of little benefit to a conventional extrusion system such as shown in FIG. 1 since they will not generate the required head pressure at the die. However, such an arrangement optimally serves the purpose of the present invention, that is, generating only enough pressure at outlet 33 to ensure that gear pump 20 is maintained full, with very little shearing due to the short length thereof, thereby avoiding excessive temperature increases as in conventional screw auger extruders due to the back flow created by the required high pressures. Also, mix section 32 is located downstream of pressure generating section 31 and imparts very little temperature increase, but its multiple cut transfer mix configuration equalizes temperature differences which may exist in the rubber stock, after exiting the pressure generating section of the feeder.

In the preferred embodiment, feed section 30 and pressure generating section 31 will have a combined linear length of between 3 and 6 times the screw diameter, and with the linear length of mix section 32 being between 1.5 and 2.5 times the screw diameter. The preferred overall linear length of sections 30, 31 and 32 is between 4.5 and 8.5 times the screw diameter. This is in contrast to a usual screw extruder of the prior art cold feed extrusion systems as shown in FIG. 1, which has an overall linear length of between 12 and 16 times the screw diameter.

Feed mixer 18 will also be provided with a plurality of chambers 36 extending about barrel 27 for containing a heated fluid for heating the barrel to a desired temperature. Circulating thermostatted fluid is provided for all screws, screw barrels, pump gears and gear pump housings. The temperature for most rubber compounds will be less than 100° C. as it moves through feed mixer 18.

Figure 3:
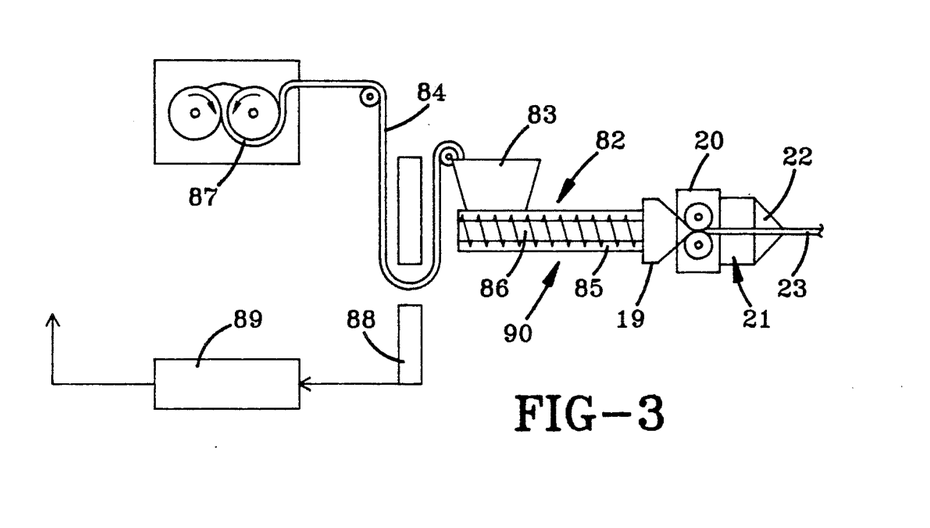
FIG. 3 is a diagrammatic view similar to FIG. 2, showing the improved extrusion system being used with a hot strip feed.

However, for certain hot feed applications where the temperature of the compound is sufficiently high, a simple helical auger configuration may be used throughout feed mixer 18, as shown for a hot feed application in FIG. 3. With such an auger, the vulcanizable compound is only pumped downstream toward the discharge end without appreciable mixing or heating to provide the necessary pressure for filling the gear teeth of the gear pump as described more fully below.

Figure 10:
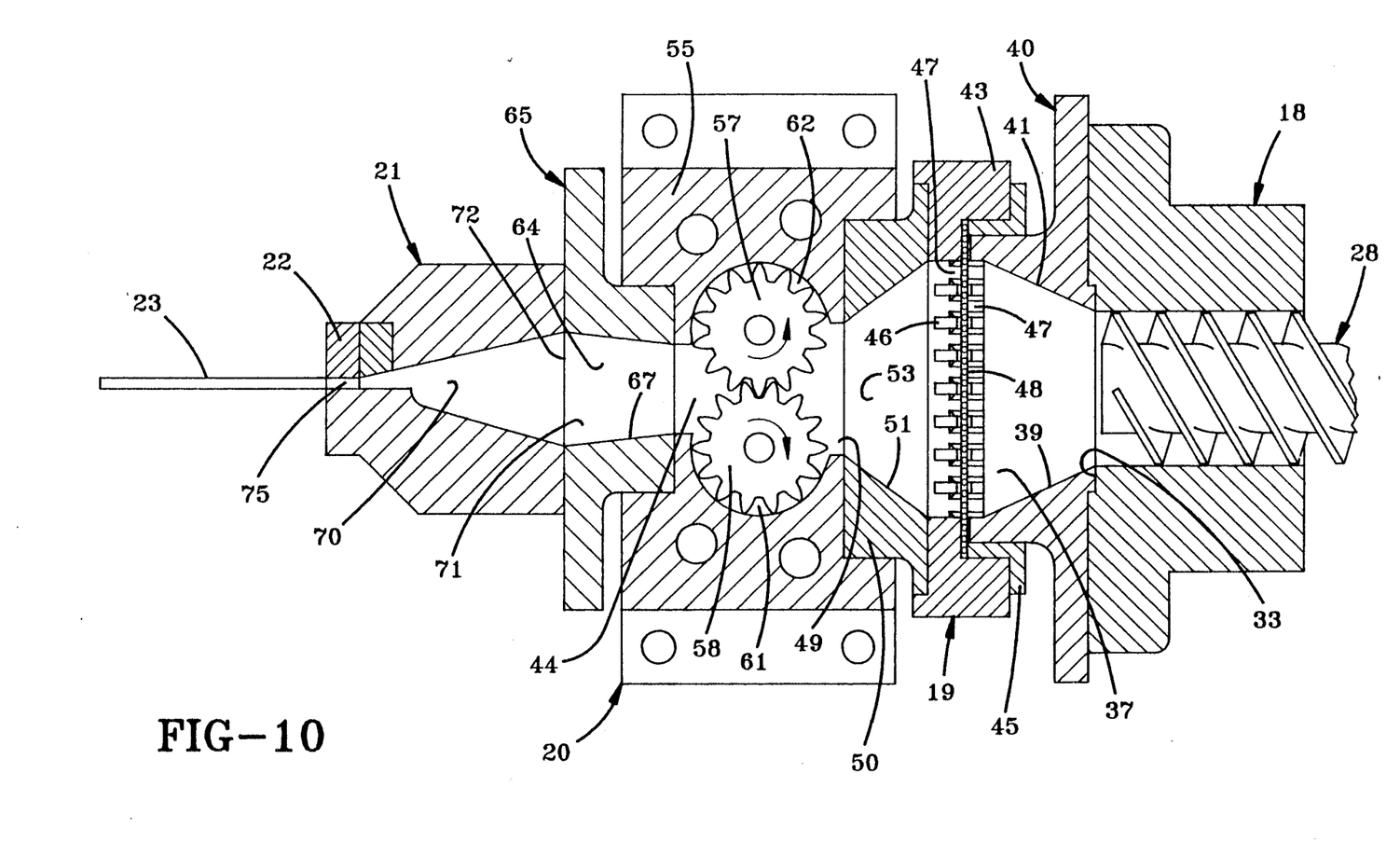
FIG. 10 is a diagrammatic sectional view of the assembled components with portions removed.
Figure 10A:
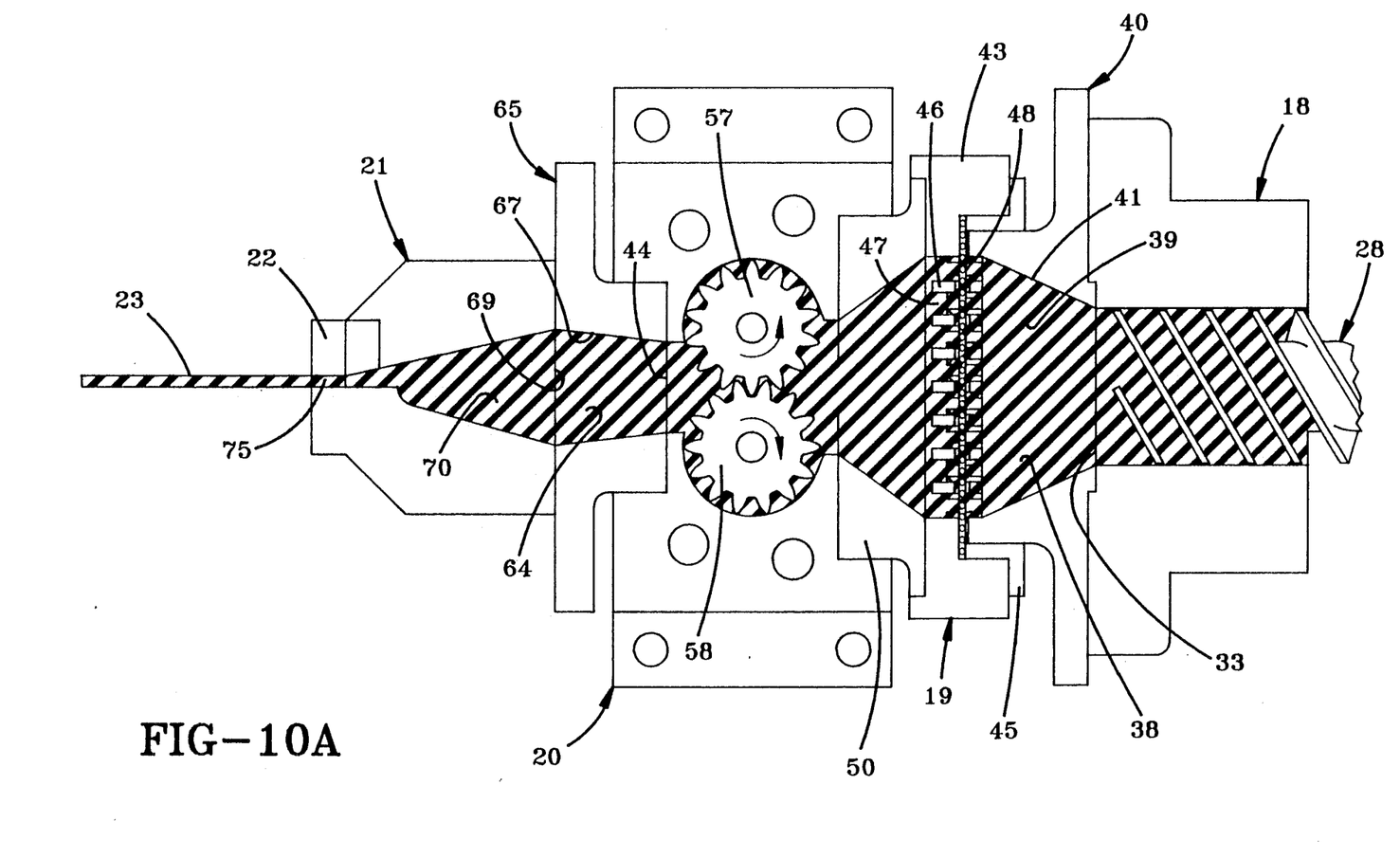
FIG. 10A is a view generally similar to FIG. 10 showing the rubber or elastomeric compound in section, moving through the assembled components.
Figure 12:
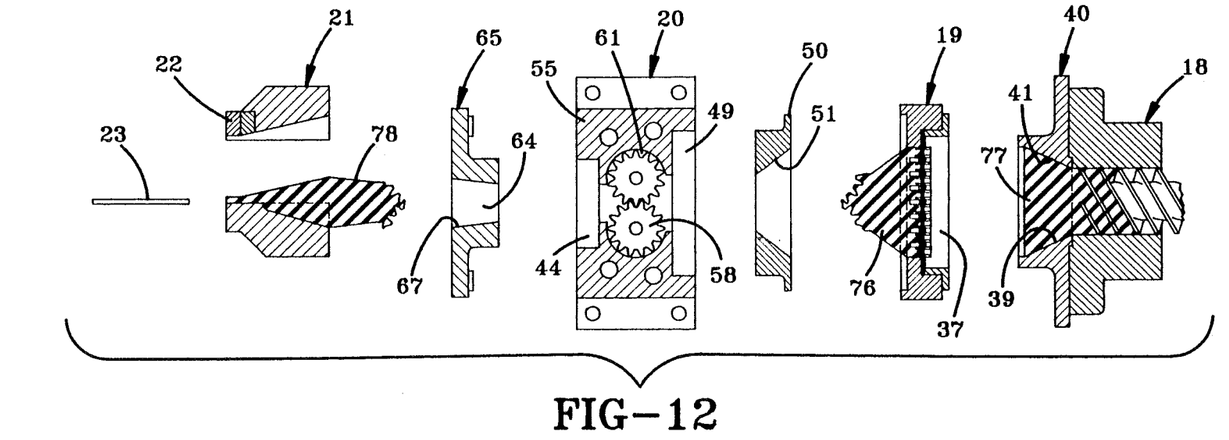
FIG. 12 is a reduced diagrammatic view similar to FIG. 11 with the components in a greater axial separated condition for cleanout.
Figure 13:
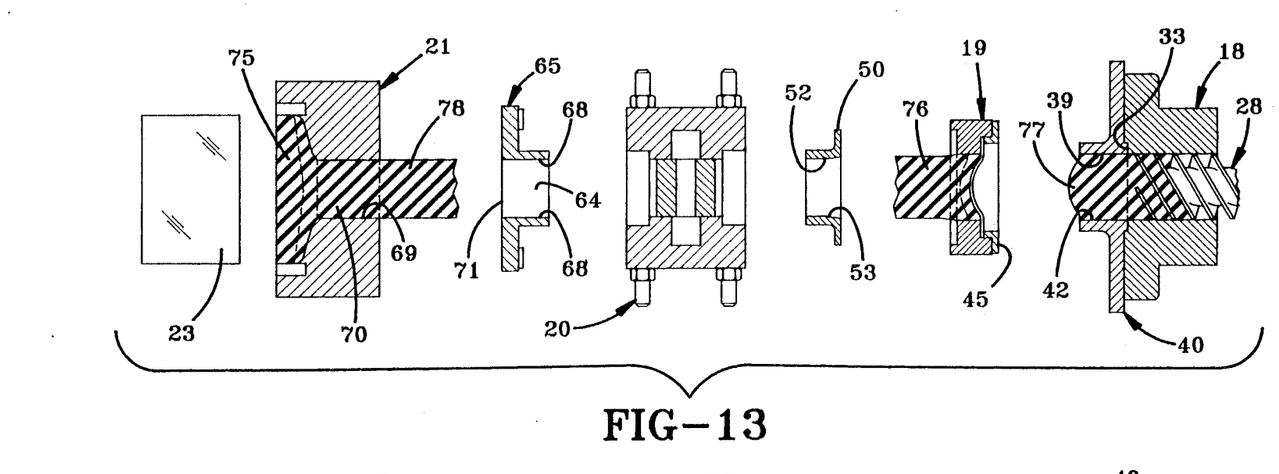
FIG. 13 is a diagrammatic top view of the axially separated components of FIG. 12.

Referring particularly to FIG. 10A, the uniformly heated and mixed rubber, indicated generally at 38, leaves outlet 33 of feed mixer 18 through a diverging and converging bore 39 of a transition plate 40. Bore 39 preferably is formed by a pair of opposed diverging surfaces 41 and a second pair of opposed preferably converging or parallel surfaces 42 (FIGS. 12 and 13).

This bore configuration and surface arrangement facilitates the cleaning and removal of rubber compound therefrom during a compound changeover procedure as described in greater detail below.

Figure 6:
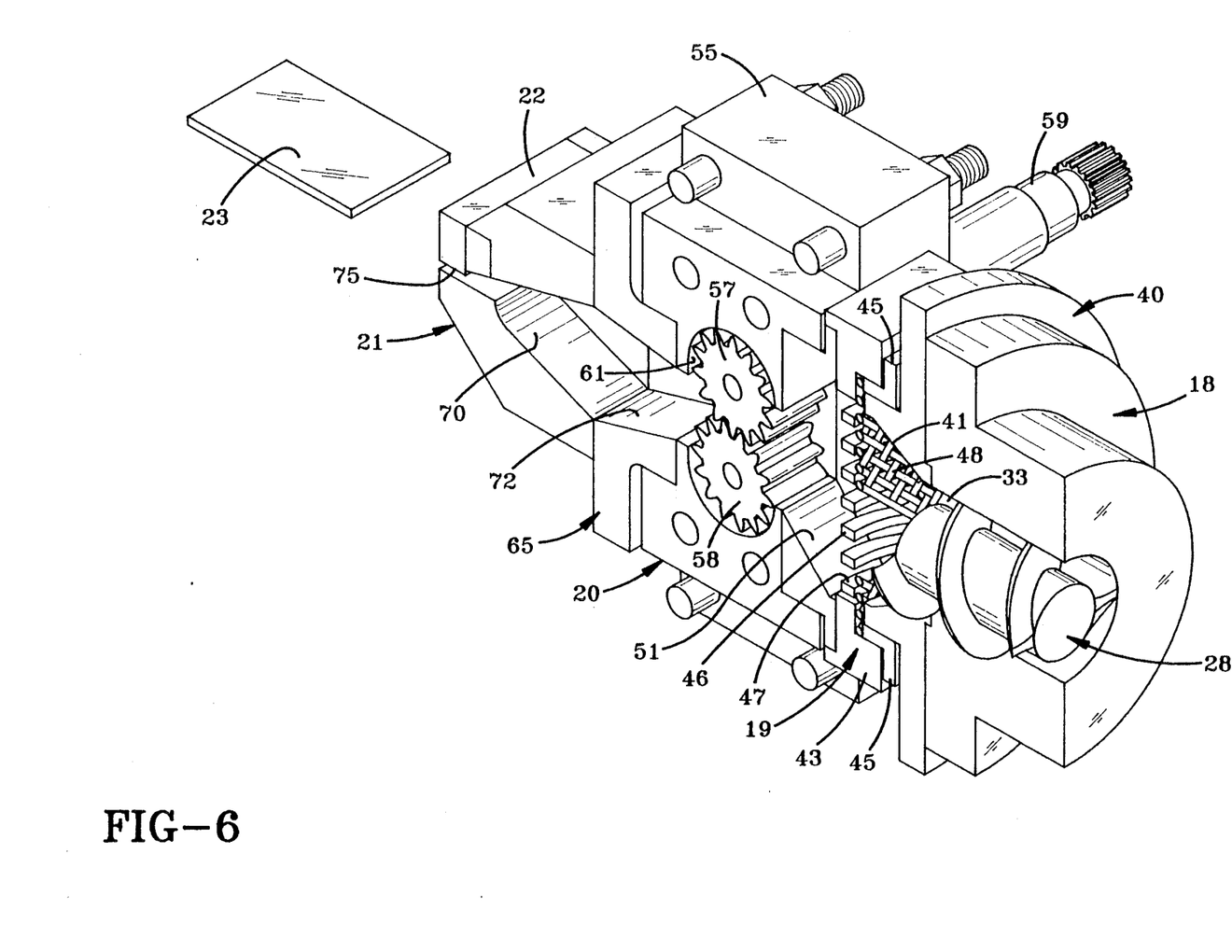
FIG. 6 is a perspective view with portions broken away, showing the components of FIG. 5 in assembled condition.

Transition plate 40 is telescopically connected immediately to low pressure drop strainer assembly 19, for example by a rectangular mounting plate 45. Strainer assembly 19 preferably is of the type as shown in previously noted U.S. Pat. No. 4,918,017. Strainer assembly 19 as shown in FIG. 6, includes a main rectangular frame 43 which is engaged with mounting plate 45 and supports a plurality of parallel elongated bars or ribs 46 which form a plurality of parallel spaced slots 47 therebetween. Ribs 46 support a straining screen 48 thereon, on the upstream side, with screen 48 being secured in a clamped position by plate 45. The configuration of ribs 46 and screen 48 can be concavely curved as shown in FIGS. 6–9 of the drawings, or have a straight configuration, in order to provide for the elongated flow spaces or slots 47 between the screen supporting ribs. The curved rib configuration is used for larger bore diameters, such as 150 mm. and larger. This construction and arrangement minimizes the pressure drop across the strainer, which in turn controls the temperature increase encountered during its use. While the pressure across conventional rubber strainers is at least 50 bar, it is generally less than 25 bar for a strainer of the type shown in FIGS. 6–13 and discussed above. Furthermore, bore 39 of transition plate 40 is telescopically received within an inlet 37 of strainer assembly 19 such that the transition flow of the rubber compound terminates adjacent the surface of strainer screen 48 (FIG. 10).

In further accordance with the invention, strainer assembly 19 is located immediately adjacent an inlet 49 of gear pump 20 and is telescopically connected thereto by a transition plate 50. Plate 50 is provided with at least one pair of opposed converging surfaces 51 and a spaced opposed pair of surfaces 52 (FIG. 8), which form the outlet 53 of strainer assembly 19. These surfaces permit the rapid and easy removal of remaining rubber upon separation of the gear pump from the adjacent components for the purpose of cleaning during a rubber compound change. Surfaces 51 and 52 also minimizes the pressure required for a complete filling of the gear pump through inlet 49. As an alternative means of removing the rubber, pins (not shown) may be inserted into inlet 49 which enables the rubber to be moved easily without use of the noted diverging surfaces.

Gear pump 20 generally consists of a main housing 55 with a removable side plate 56 to provide access into a pair of meshing feed gears 57 and 58 rotatably mounted within a metering chamber 61. Gears 57 and 58 preferably are rotated through a single power driven drive shaft 59 in a manner well known in the art.

After passing through gear pump outlet 44, the discharged rubber is immediately passed through a bore 64 of a transition plate 65 into the inlet 69 of extrusion head 21 (FIG. 10A). Bore 64 preferably is formed with a pair of opposed diverging surfaces 67 and a pair of opposed either converging or parallel surfaces 68 (FIGS. 8, 10, 12 and 13).

In further accordance with the invention, bore 64 is located immediately adjacent gear pump outlet 44 and communicates immediately with spread chamber 70 of extrusion head 21. Transition plate 65 includes an outlet end 71 which communicates directly with opening 72 formed in the rear of extrusion head 21 (FIG. 10). By this arrangement, the rubber compound exiting from the end of bore 64, immediately flows into spread chamber 70 of extrusion head 21 and begins to converge toward die opening 75. This arrangement eliminates a dead space between the extrusion head and gear pump as occurs in many prior art arrangements and enables a steady state flow of rubber to be achieved more quickly and reduces starting time and scrap during compound changes. Thus, the rubber after leaving gear pump 20 almost immediately flows into spread chamber 70 of extrusion head 21 and through the predefined die opening 75 provided by die 22 which provides the desired configured rubber strip 23. Furthermore, in the preferred embodiment, the rubber compound will have a residency of less than 10 seconds within the extrusion head (FIGS. 10 and 10A).

This precision extrusion of strip 23 is accomplished principally by the use of gear pump 20 in combination with the other components discussed above, whereby pump 20 delivers accurately controlled volumetric amounts of rubber immediately to the extrusion head, with the inlet of pump 20 being appropriately designed to minimize the pressure required for complete filling of the gear pump gears at all times. One of the main differences of pump 20 over a conventional gear pump design is that, on disassembly, the rubber is readily removable from the entrance and exit ports upon axial separation. Furthermore, pump 20, in combination with flow control device 54, extends the advantages of large entrance ports, that is, ones having absolute minimum feed pressure and the lowest internal pump friction, to metering service.

Figure 10B:
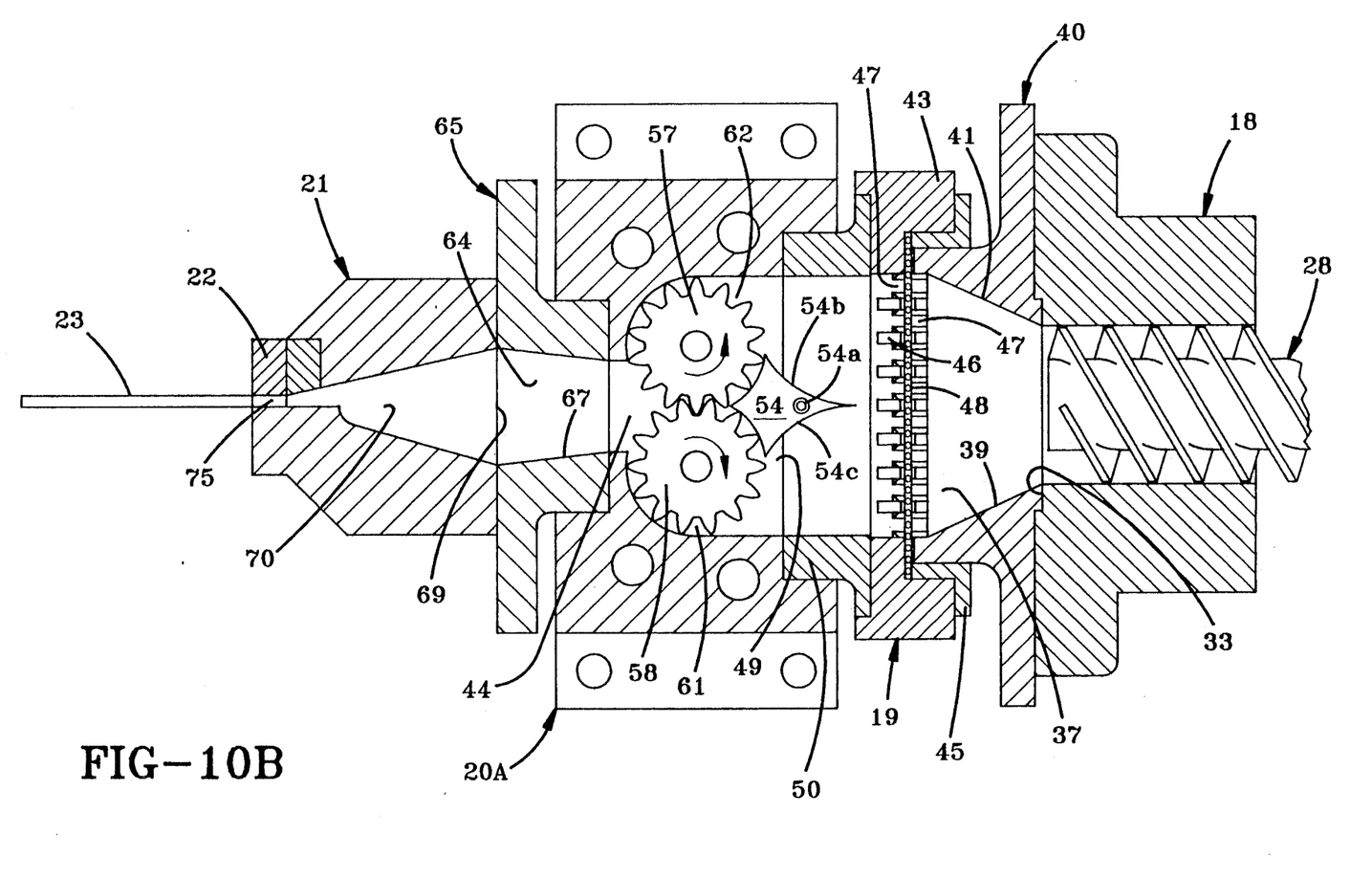
FIG. 10B is a sectional view generally similar to FIGS. 10 and 10A showing use of a large inlet gear pump and flow divider.

FIG. 10B shows a slightly modified form of the improved extrusion apparatus, which uses a gear pump 20A having a large inlet port. Large mouth pumps are produced by various companies such as identified under the trademark VACOREX pumps produced by Maag Pump Company of Zurich, Switzerland, and work very well for pumping high viscosity polyethylene terephthalate melt from vacuum chambers at pressures less than 0.001 bar. In such an application, gear cavities do not completely fill in sweeping across the face of the pump inlet but reach their final fill, occasionally incomplete, in compression zones. Since the gear cavities accept filling all across the inlet flow stagnation is prevented. Another advantage is less friction due to reduced angle of contact between pump housing and polymer in gear cavities. However, the use of such large mouth pumps heretofore was not recommended for metering service as in the present invention. If the inlet pressure is high enough to ensure complete gear cavity filling under all conditions then under most conditions, cavities will fill before sweeping the entire inlet port. Once filled, the gears block flow from the outer portions of the inlet flow channel. With rubber compound as in the present invention, even intermittent blockages are unacceptable because rubber rheology encourages channels to persist once they are formed.

The use of a flow enhancer or enhancement device 54 makes large mouth pumps or large inlet ports practical for metering pumps by controlling the fill point of the gears to prevent channel blockage by: improving velocity distribution through the upstream strainer and transition plate 50 by retarding center flow; providing two more surfaces to converge flow from the strainer area to the gear filling area more quickly and at a lower pressure drop; providing converging surfaces for rubber withdrawal during cleanout; providing potential heat transfer surfaces; and providing an easily changeable device in order to customize the gear filling area to process needs. Device 54 is best mounted on and withdrawn with transition plate 50 but could be formed as a part of gear pump 20A if desired.

Flow enhancer 54 preferably is located within inlet 49 of large inlet gear pump 20A to channel and direct the incoming flow of rubber towards the outside or teeth filler zones of the gear teeth by a pair of outwardly curving surfaces 54b and 54c. Flow enhancer 54 enhances the loading of the gear teeth and eliminates the recirculation of the rubber adjacent the walls. Flow enhancer 54 retards filling in the center of the teeth but provides enough tooth spaces at the outside area for filling. It balances the flow through strainer assembly 19 instead of concentrating it through the center portion of the strainer.

Fluid passages 54a are also provided in flow enhancer 54 to provide for the flow of cooling and heating fluid to assist in maintaining the control of the temperature of the rubber compound during shutdown and startup. Flow enhancer 54 also assists in removing rubber during changeover and cleanout operations. The incoming rubber thus is channeled by flow enhancer 54 into the spaces 62 formed between the adjacent teeth on feed gears 57 and 58 at the outside area thereof, which accurately measures the amount of rubber which is transferred by the teeth through chamber 61 and discharged through an outlet 44 in a manner well known in the gear pump metering art.

Figure 7:
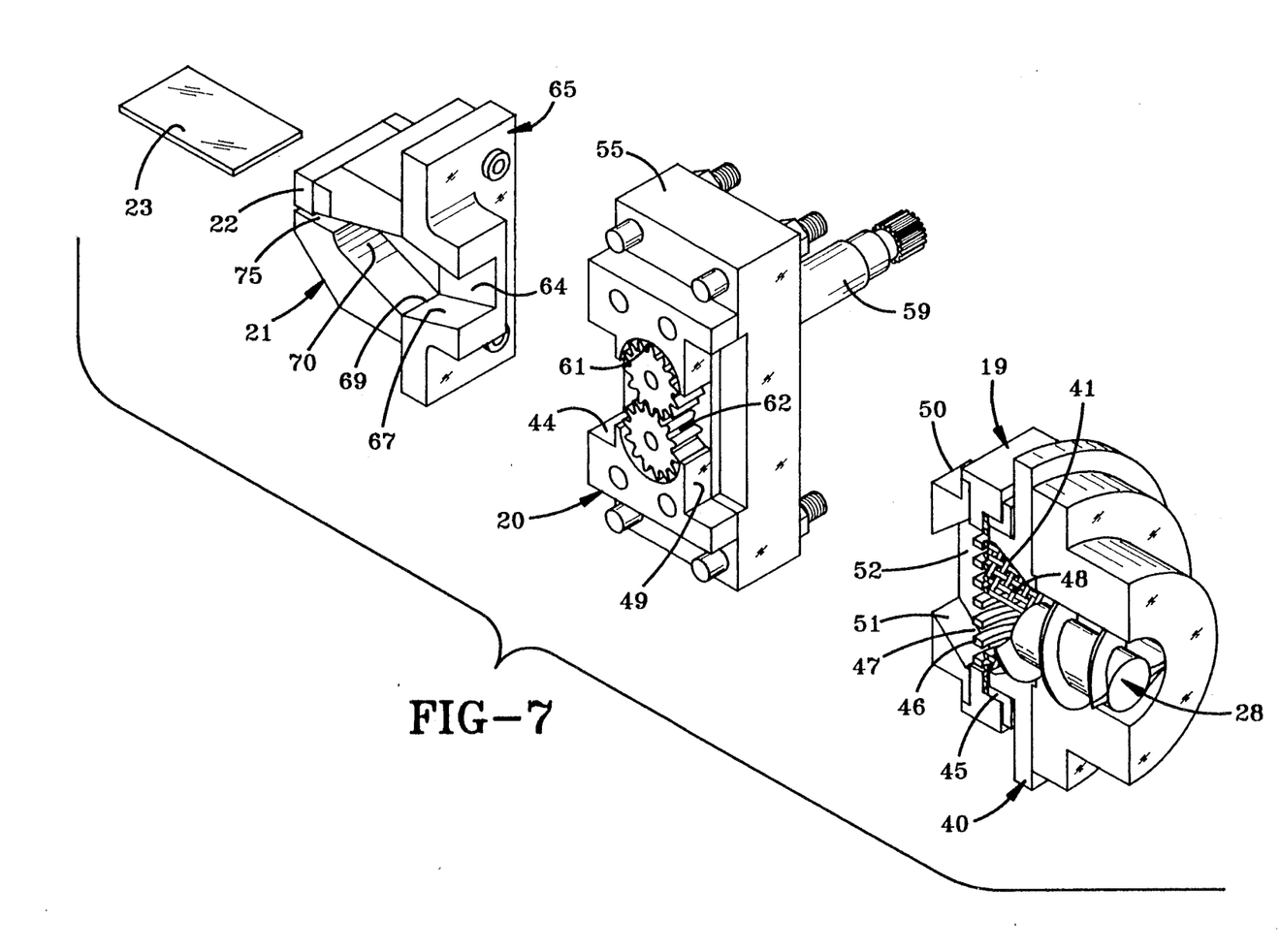
FIG. 7 is a reduced scale diagrammatic perspective view of the component of FIGS. 5 and 6 shown in a partial axial separated condition.
Figure 8:
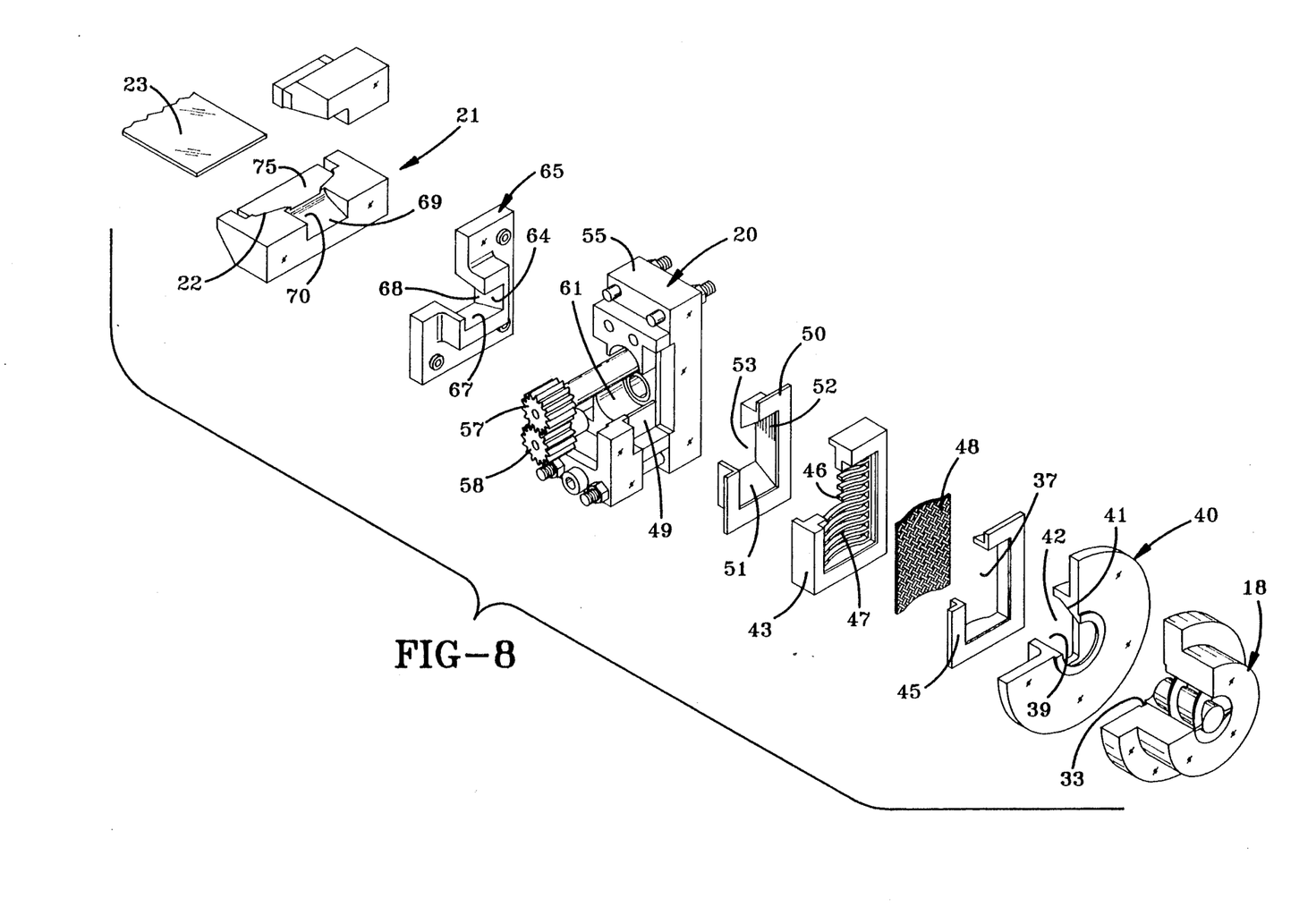
FIG. 8 is a further reduced scale diagrammatic perspective view similar to FIG. 7, with the components of FIGS. 5 and 6 shown in a further axial separated condition.
Figure 9:
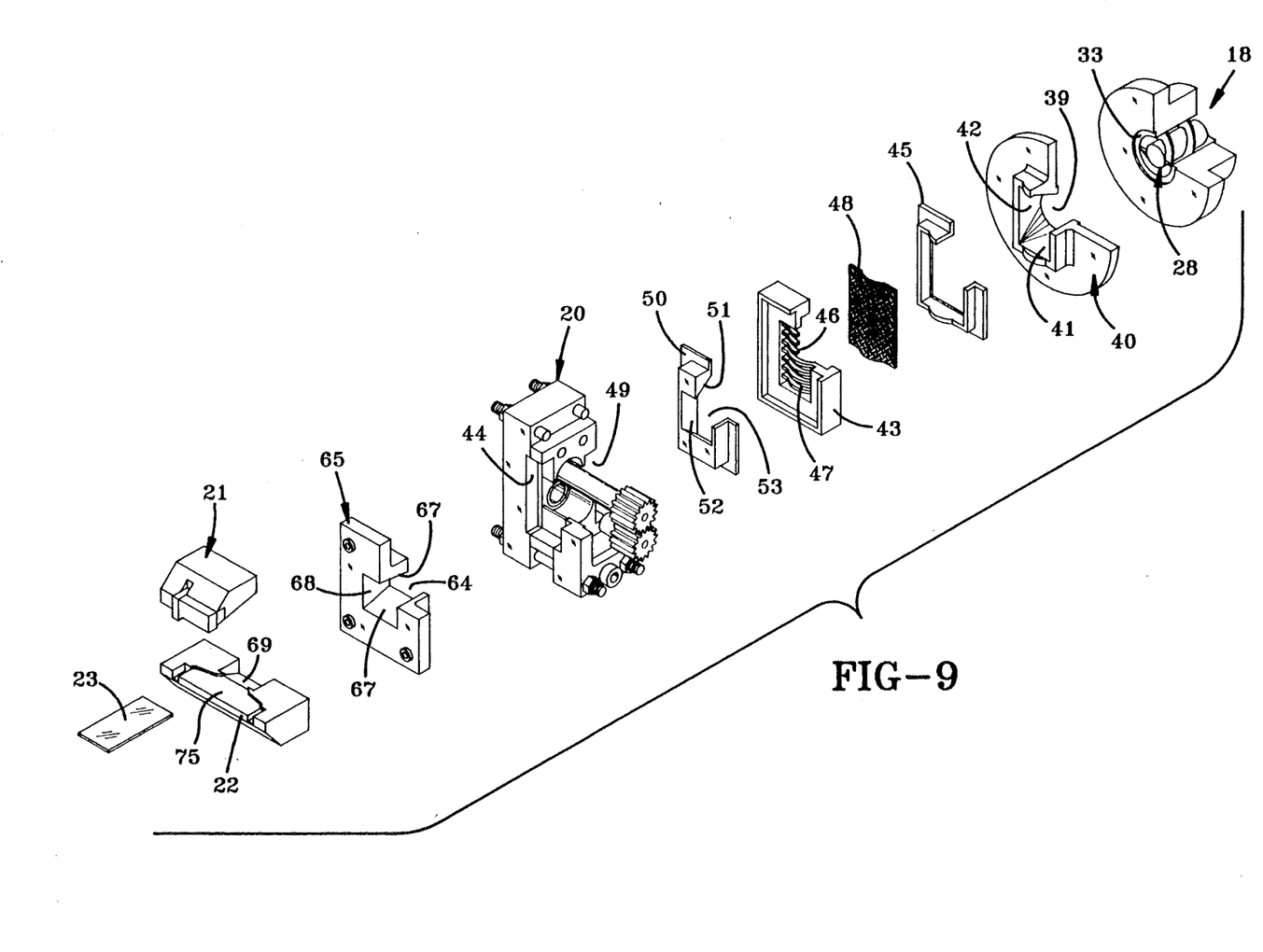
FIG. 9 is a diagrammatic perspective view similar to FIG. 8, but at a 180° orientation therefrom.
Figure 11:
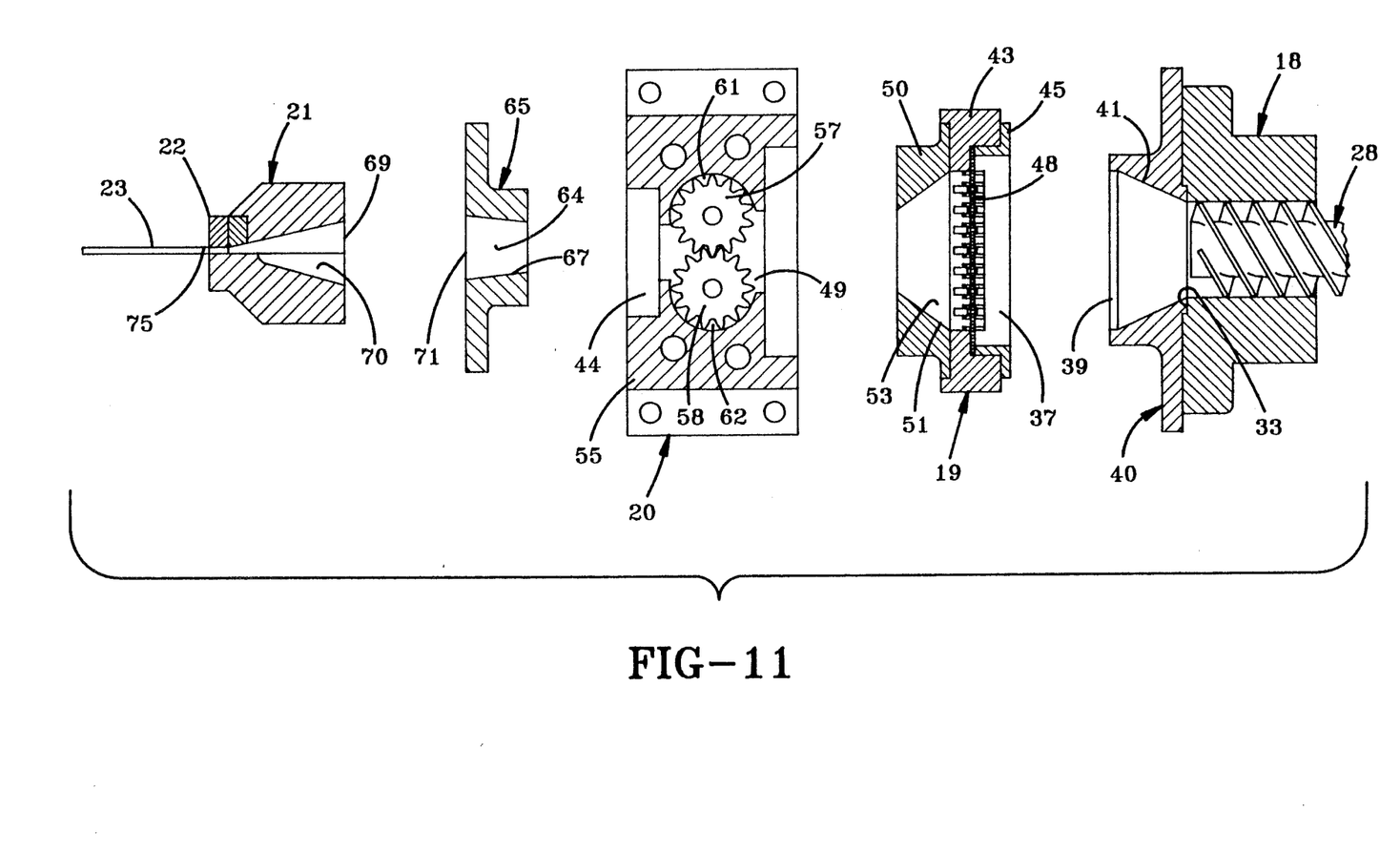
FIG. 11 is a reduced scale diagrammatic side elevational view similar to FIG. 10, with certain of the components in an axial separated position for cleanout.

In accordance with another feature of the invention which is best illustrated in FIGS. 11, 12 and 13, the individual components are easily separated, preferably in an axial direction, to enable the various components to be easily accessible to enable the rubber contained therein and extending between the components, to be easily removed upon a rubber compound change. Preferably, the individual components will be mounted on slide rods (not shown) by bearing sleeves or the like, which may be automatically controllable by pneumatic or hydraulic cylinders. With this arrangement, an operator, upon a rubber compound change, can merely actuate certain control buttons which will automatically separate the components. For example, low pressure strainer 19 and die assembly 21, together with their respective transition plates 50 and 65, respectively, will be moved axially away from inlet 49 and outlet 44 of gear pump 20, as shown in FIG. 7, for ease of removal of the rubber trapped therein. Next, transition plate 50 can be axially separated from low pressure strainer assembly 19 as shown in FIGS. 12 and 13, whereby the tapered surfaces 51 and 52 of transition plate 50 enable the trapped block of rubber 76 to be removed easily therefrom. Moreover, axial separation of transition piece 40 from screen clamp 45 causes rubber block 77 to separate from screen 48 but remaining in transition piece 40. Thus, rubber block 77 is then easily removed by turning of the extruder screw 28.

Likewise, the axial separation of transition plate 65 from gear pump 20 and extrusion head 21, and in particular the configuration of surfaces 67 and 68 which form bore 64 and the tapered surfaces forming spread chamber 70, enables trapped rubber block 78 to be easily removed from transition plate 65, outlet 44 of gear pump 20 and from spread chamber 70. Any rubber remaining within feed mixer 18 is removed easily by turning of screw 28 whereby the rubber will be moved forwardly into and through bore 39 of transition plate 40. Rubber blocks 76–78 preferably can be manually removed by a workman after the axial separation of the components as shown particularly in FIGS. 12 and 13.

In further accordance with the invention, the various components of the improved system are interconnected by a control system shown generally diagrammatically in FIG. 2. First, the speed of pump 20 and of the downstream cooling conveyors are selected to extrude a desired profile of rubber strip 23 upon passing through die opening 73, whereby the screw rpm of feed mixer 18 is automatically adjusted to provide a near constant pressure at the entrance point of gear pump 20. This pressure reading is designated as $P_2$ and is shown in FIG. 2. Temperatures and pressures at various other positions in the system are measured as inputs for algorithms which are designed to induce changes in the speed of feed mixer 18 during startup, shutdown and steady state operation, to maintain the desired pressures, feed rates and temperatures throughout the entire system. These various readings are fed to a control computer 80 for adjusting the speed of feed mixer 18 and the feed rate of gear pump 20 through the control of gear drive shaft 59.

The details of the various components described above and shown in the drawings, namely feed mixer 18, low pressure strainer 19, gear pump 20 and extrusion head 21 may be modified from that shown particularly in the drawings, without affecting the main concept of the invention. This concept is providing an extremely compact extrusion system and related method which enables an accurately controlled, specifically profiled, strip of rubber to be extruded through a die head at an efficient operational speed, preferably without exceeding acceptable temperatures which could be harmful to the rubber strip. Furthermore, this system and method enable the rubber compound to be fed directly into the feed mixer without first having to process the rubber to remove harmful foreign materials therefrom, since these materials are removed by low pressure strainer 19 located immediately between the output of the feed mixer and the input of the gear pump.

Reaching steady state conditions quickly is assisted by the low volume spread chamber in the extrusion head and by appropriate startup procedures. Although the smaller dimensional extrusion heads require higher pressures, these pressures can be provided for easily in the present system by the use of the gear pump without large increases in temperature, as occurs in prior art extrusion systems. The gear pump enables the head pressure and flow to equilibrate quickly after start up of the system which in turn causes extrudate dimensions to reach the designated specifications. Tests have shown that the extrusion of rubber equivalent to 10 times the volume contained in the extruder head is required to reach steady state flow and desired extrudate dimensions. In prior art rubber extrusion systems, this may take up to five minutes because of the large volume extrusion heads. However, in the present system, less than 30 seconds are needed to reach equilibrium due to the gear pump, the smaller volume extrusion heads and by the use of appropriate start up procedures.

The unique system and component arrangement of the invention furthermore enables the various components to be separated easily in both axial and transverse directions to enable the rubber remaining in the system components to be removed quickly during compound changes, usually by manual operations, whereby the components can then be reassembled quickly and automatically for the subsequent flow of a different compound rubber therethrough.

FIG. 3 shows a slightly modified form of the invention in which the compact extrusion system can be modified for use with a hot strip feed. As shown in FIG. 3, extrusion apparatus indicated generally at 82, will consist of an inlet chute 83 wherein an incoming heated strip of rubber or elastomeric compound 84, heated to a temperature of between 80° C. and 110° C, is moved through the bore of a heated barrel 85 by a single helical thread auger 86 which forms a feed mixer 90. This rubber compound then passes through low pressure screen assembly 19, through gear pump 20 and extrusion head 21, and subsequently through die 22 for forming the profile of rubber strip 23. Strip 84 preferably is preheated by mill rolls 87, which heats and blends the rubber into strip 84. The strip also may pass through a usual loop depth detector 88 which supplies a signal to a controller 89 which, in turn, provides a signal to the feed components withdrawing the strip from mill rolls 87.

Again, the individual components of extrusion apparatus 82 are similar to those described above, except that the unique combination of thread configurations of feed mixer 18 preferably is replaced by a single length of helical auger 86. However, the remaining components are similar, as well as the functions thereof, including the axial and transverse separation for removal of the trapped rubber for cleanout during a compound change.

Accordingly, the improved system and method of the invention are simplified, provide an effective, safe, inexpensive, and efficient system and method which achieves all the enumerated objectives, provide for eliminating difficulties encountered with prior systems and methods, and solve problems and obtain new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention are by way of example, and the scope of the invention is not limited to the exact details shown or described.

Having now described the features, discoveries and principles of the invention, the manner in which the improved extrusion system and method of the invention are constructed and used, the characteristics of the construction, and the advantageous, new and useful results obtained; the new and useful structures, devices, elements, arrangements, parts and combinations, and method steps, are set forth in the appended claims.

We claim:

1. A method of extruding a strip of vulcanizable rubber or elastomeric compound including the steps of:
    a) moving a strip of the compound through a screw type extruder;
    b) uniformly heating and mixing the compound as it moves through the extruder;
    c) maintaining the temperature of the heated compound in the extruder less than 100° C.;
    d) passing said compound strip through a strainer to remove foreign matter from the compound;
    e) maintaining the pressure drop across the strainer at less than 25 bars;
    f) delivering precise volumetric amounts of the compound to an extrusion head by passing said compound through a gear pump; and
    g) extruding strips of compound from the extrusion head by reforming the compound received from the gear pump as it moves through the extrusion head.

2. The method defined in claim 1 including the step of separating the extrusion head and strainer from the gear pump for removal of compound therebetween prior to a change in compound.

3. The method defined in claim 1 including the step of expanding the volume of the compound as it exits the extruder and enters the strainer.

4. The method defined in claim 1 including the step of reducing the volume of the compound as it enters the gear pump from the strainer.

5. The method defined in claim 1 including the steps of providing a spread chamber in the extrusion head and delivering the compound from the gear pump immediately into said spread chamber free of any movement of the compound through an intervening space.

6. The method defined in claim 1 including the step of transferring the compound between screw flights of an extruder screw and grooves formed in a barrel of the extruder as the compound is mixed in the extruder.

7. The method defined in claim 1 including the step of adjusting the speed of the screw as the compound moves through the extruder to provide a near-constant pressure at an inlet of the gear pump.

8. The method defined in claim 7 including the step of measuring temperatures and pressures of the compound as it moves through the extruder and changing the speed of said compound moving through the extruder in relationship thereto.

9. The method defined in claim 8 including the step of setting the speed of the gear pump and matching the speed of the extruder to deliver the precise amounts of compound to the extrusion head.

10. The method defined in claim 1 including the step of feeding strips of compound at near ambient temperature into the extruder prior to being heated and mixed.

11. The method defined in claim 1 including the step of dividing the compound upon entering the gear pump to form two separate streams of said compound for filling gears of the gear pump; and controlling the filling of gear cavities so as to prevent stagnate zones at inner portions of the flow.

12. The method defined in claim 1 in which the step of uniformly mixing and heating the strip of compound in the extruder includes initially moving the compound axially along the screw and then generating a pressure within the moving compound to heat said compound prior to thoroughly mixing said compound.

13. The method defined in claim 1 including the step of heating the compound to a temperature of between 80° C. and 100° C. before moving it through the extruder.

14. The method defined in claim 1 including providing a feed section, a pressure generation section and a mix section in the screw type extruder; and providing the feed section with an axial length between 4.5 and 8.5 times the diameter of the extruder screw.

15. The method defined in claim 14 including providing the mix section with an axial length between 1.5 and 2.5 times the diameter of the extruder screw.

16. The method defined in claim 1 including partially heating the strips of compound prior to entering the extruder and then raising the temperature of said compound to a desired temperature and internal pressure by moving said compound around the flights of a helical screw of said extruder.

* * * * *